(12) United States Patent
Klein

(10) Patent No.: US 11,365,811 B2
(45) Date of Patent: Jun. 21, 2022

(54) TAPPING ARMATURE FOR LIQUID CONTAINERS

(71) Applicant: PROTECHNA S.A., Fribourg (CH)

(72) Inventor: Thilo Klein, Bonn (DE)

(73) Assignee: PROTECHNA S.A., Fribourg (CH)

( * ) Notice: Subject to any disclaimer, the term of this patent is extended or adjusted under 35 U.S.C. 154(b) by 0 days.

(21) Appl. No.: 16/956,336

(22) PCT Filed: Dec. 14, 2018

(86) PCT No.: PCT/EP2018/084923
§ 371 (c)(1),
(2) Date: Jun. 19, 2020

(87) PCT Pub. No.: WO2019/149421
PCT Pub. Date: Aug. 8, 2019

(65) Prior Publication Data
US 2021/0080010 A1    Mar. 18, 2021

(30) Foreign Application Priority Data

Jan. 30, 2018  (DE) ...................... 10 2018 102 062.7

(51) Int. Cl.
*F16K 1/20* (2006.01)
*F16K 27/06* (2006.01)

(52) U.S. Cl.
CPC ............ *F16K 1/2014* (2013.01); *F16K 1/205* (2013.01); *F16K 27/06* (2013.01)

(58) Field of Classification Search
CPC ........ F16K 1/2014; F16K 1/205; F16K 27/06; F16K 1/36; F16K 1/222; F16K 1/2261
See application file for complete search history.

(56) References Cited

U.S. PATENT DOCUMENTS

| 2,534,942 | A | * | 12/1950 | Barling | .................. F16K 1/205 |
| | | | | | 4/387 |
| 4,190,074 | A | * | 2/1980 | Mailliet | .................. C21B 7/007 |
| | | | | | 137/315.16 |
| 10,962,120 | B2 | * | 3/2021 | Zlatintsis | ................ F16K 1/205 |

(Continued)

FOREIGN PATENT DOCUMENTS

AU          407295         3/1965
DE          877388 C   *   5/1953   ........... F16K 1/2014

(Continued)

*Primary Examiner* — Marina A Tietjen
(74) *Attorney, Agent, or Firm* — Dickinson Wright PLLC; Andrew D. Dorisio

(57) ABSTRACT

A tapping armature for liquid containers, in particular for being connected to the outlet neck or outlet opening of a transport and storage container, having an armature housing in which a valve body for opening and closing a flow cross-section of an outlet tube is pivotable with the help of a valve shaft, the valve body including a valve seal arranged, at least partially, at a peripheral edge of the valve body, such that, in a shut-off position of the valve body, a valve gap formed between the valve body and an internal wall of the outlet tube is sealed in a radial sealing plane by the valve seal, wherein at least one inner side of the valve body that faces a liquid volume for shut-off is covered by the valve seal such that a liquid contact face arranged on the inner side is realised by the valve seal.

2 Claims, 4 Drawing Sheets

(56) References Cited

U.S. PATENT DOCUMENTS

| | | | |
|---|---|---|---|
| 2001/0017362 A1 | 8/2001 | Schutz | |
| 2017/0328477 A1* | 11/2017 | Andoh | F16K 11/0525 |
| 2018/0126612 A1* | 5/2018 | Kato | F02M 35/112 |
| 2018/0171943 A1* | 6/2018 | Sugawara | F16K 1/226 |
| 2020/0173562 A1* | 6/2020 | Itahara | F16K 1/205 |

FOREIGN PATENT DOCUMENTS

| | | | | |
|---|---|---|---|---|
| DE | 19727236 A1 | | 1/1999 | |
| DE | 102009006823 A1 * | | 8/2010 | F16K 1/2261 |
| EP | 1975479 A2 | | 10/2008 | |
| EP | 1975479 A3 | | 10/2008 | |
| GB | 2021734 A | | 12/1979 | |
| GN | 107366754 A | | 11/2017 | |
| JP | 2013044415 | | 3/2013 | |
| KR | 1020110087767 | | 8/2011 | |
| RU | 115767 U1 | | 5/2012 | |
| RU | 2564726 C2 | | 10/2015 | |
| WO | 2015147197 A1 | | 10/2015 | |
| WO | 2017121543 A1 | | 7/2017 | |

\* cited by examiner

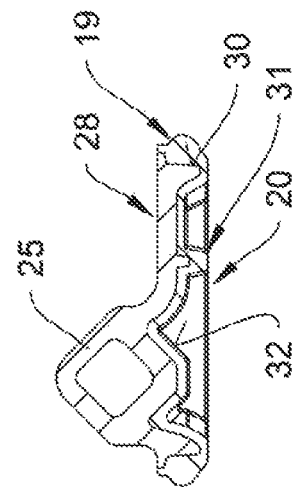
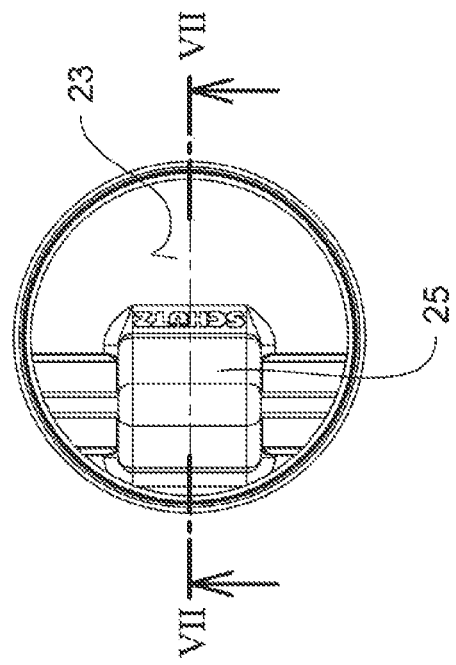
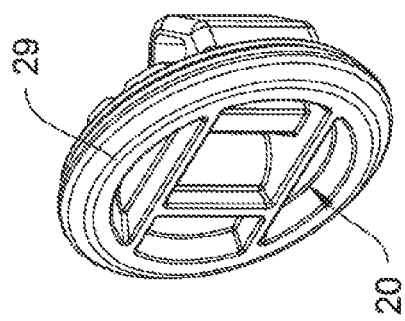
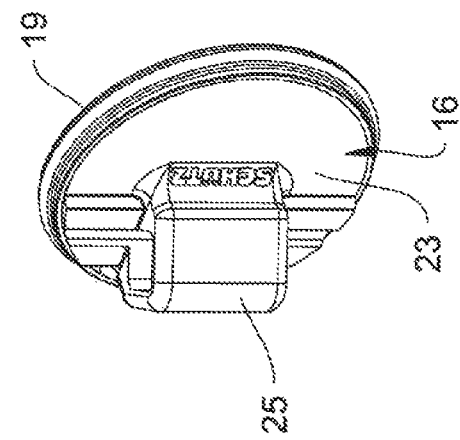

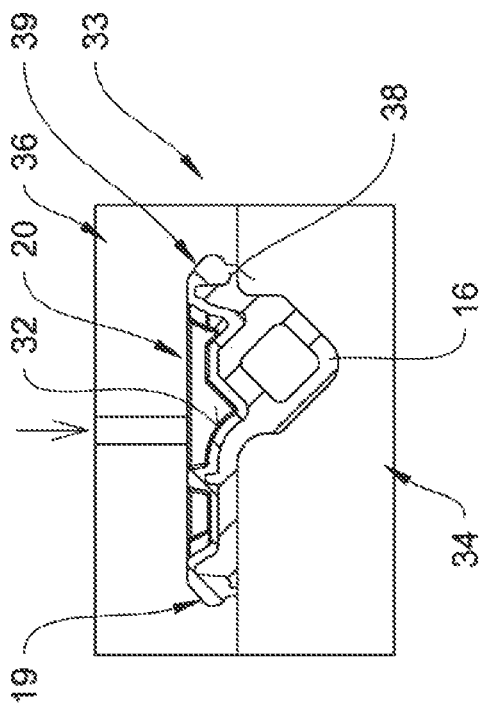
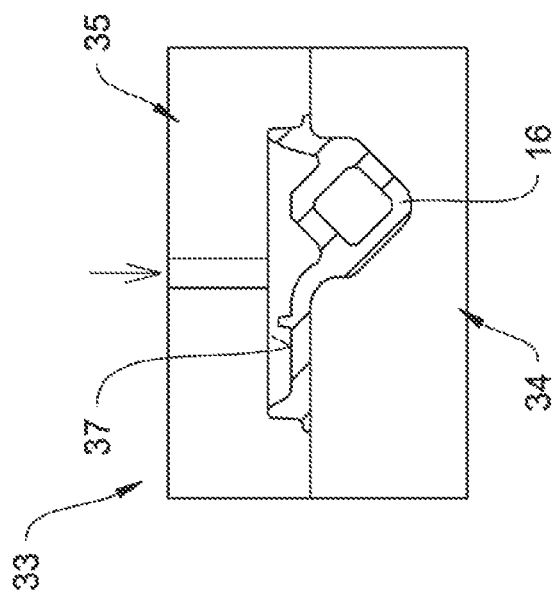

TAPPING ARMATURE FOR LIQUID CONTAINERS

FIELD OF THE INVENTION

The invention relates to a tapping armature for liquid containers, in particular for being connected to the outlet neck or to the outlet opening of a transport and storage container for liquids, having an armature housing in which a valve body for opening and closing a flow cross-section of an outlet tube of the armature housing is arranged that is pivotable with the help of a valve shaft, said valve body including a valve seal that is arranged, at least partially, at a peripheral edge of the valve body, in such a manner that, in a shut-off position of the valve body, a valve gap that is formed between the valve body and an internal wall of the outlet tube is sealed in a radial sealing plane by means of the valve seal.

BACKGROUND OF THE INVENTION

In order to allow for a reliable sealing of the flow cross-section, the valve body, on the one hand, needs to be sufficiently stiff in order to allow for a reliable transmission of a torque that is applied to the valve body via the valve shaft, without entailing deformations of the valve body, which could lead to dislocations of the valve seal out of the sealing plane, consequently potentially jeopardising a reliable sealing of the valve gap. On the other hand, the valve seal needs to be sufficiently flexible in order to guarantee that the valve seal fits sufficiently snugly to the internal wall of the outlet tube to the extent that is required for sealing.

Additionally, it is required with the known tapping armature that both the valve body and the valve seal, which are both, with the known tapping armature, exposed to a permanent contact with liquid in a shut-off position, have a sufficient chemical resistance to the liquid.

With the known tapping armature, it is therefore required that the valve body is formed from a material that does not only have the stiffness that is required for a reliable functioning of the valve body, but also has sufficient chemical resistance for the permanent contact with liquid.

The corresponding combination of valve body material properties that is required with the known tapping armature therefore limits the potential choice of materials from the outset.

SUMMARY OF THE INVENTION

The present invention is based on the task of proposing a tapping armature that allows for a choice of materials for the valve body regardless of the chemical resistance of said materials in order to be able to optimise the material that is used for the valve body predominantly with regard to the mechanical properties without specific requirements concerning the chemical resistance.

To solve this task, the tapping armature in accordance with the invention has the features of claim 1.

In accordance with the invention, at least one inner side of the valve body that faces a liquid volume for shut-off is covered by the valve seal in such a manner that a liquid contact face that is arranged on the inner side is realised by the valve seal.

The design of the tapping armature in accordance with the invention thus avoids, in the shut-off position, a contact between the valve body and the liquid so that the valve body can be optimised with regard to its mechanical properties irrespective of a specific chemical resistance.

To this end, the liquid contact face that is arranged on the inner side is realised by the valve seal so that the surface of the inner side of the valve body is formed from the same material as the material that is used for reliably sealing the valve body against the outlet tube, in other words from the material of the valve seal.

Thus, a polypropylene that is, for instance, used for producing the valve seal can at the same time be located on the inner side of the valve body so that the valve body is shielded from a direct contact with liquid on its inner side by means of the material of the valve seal. When choosing the material for producing the valve body, it is therefore possible to use the one material that predominantly allows for the desired stiffness of the valve body irrespective of the specific chemical resistance of the material. In this way, with a fibre-reinforced plastic material that is used for producing the valve body and that has a glass fibre content, such as polypropylene, for example it proves to be uncritical in practice if glass fibres, which do not have chemical resistance against certain liquids that are often received in a transport and storage container, are arranged in the surface of the valve body in an exposed fashion since the surface of the valve body is shielded, at least on its inner side, from a direct contact with liquid by means of the valve seal or rather by means of the material that is used for the valve seal.

Preferably, the valve seal is materially bonded to the valve body on a sealing contact face so that a clearance into which liquid could enter is in any event prevented from being formed between the valve body and the valve seal. Additionally, it is thus possible to produce the valve body together with the valve seal in one single injection moulding process.

Consequently, a reduction of the individual parts that are needed for producing the tapping armature is also made possible since the valve seal does not have to be provided independently from the valve body anymore in this advantageous design of the tapping armature.

If, for realising the material bond, the sealing contact face of the valve body is provided with axial projections that protrude from the radial sealing plane, a larger contact surface are can be realised, which provides for a particularly good adhesion of the valve seal on the valve body.

Preferably, the sealing contact face of the valve body does not include any radial offsets so that, during the production of the valve body that is provided with the valve seal in an injection moulding process, moulding the valve body does not require the use of a moulding tool that is provided with mould slides.

If, additionally, the valve seal, with an axial end face of a sealing edge that is arranged at the peripheral edge of the valve body is arranged so as to be substantially flush mounted with an outer side of the valve body that is opposite from the inner side of the valve body, the production of the valve body that is provided with the valve seal in a two-component injection moulding process only requires exchanging one mould half of the two mould halves of a moulding tool that are needed for producing the valve body, it being possible that the valve body can stay in the same mould half during production.

Consequently, a removal step from the mould that has been required to date, before the valve body was combined with the valve seal, for removing the valve body from a mould half and for inserting the valve body into a new mould half before the valve seal is extruded onto the valve body becomes obsolete.

BRIEF DESCRIPTION OF THE DRAWING FIGURES

A preferred embodiment of the tapping armature will be explained in more detail below using the drawings.

In the figures:

FIG. 4 shows a perspective illustration of a valve body of the tapping armature that is illustrated FIGS. 1 to 3, with a view from above onto an outer side of the valve body;

FIG. 5 shows the valve body that is illustrated in FIG. 4 with a view from above onto an inner side of the valve body;

FIG. 6 shows the valve body that is illustrated in FIGS. 4 and 5 in a view from above;

FIG. 7 shows the valve body that is illustrated in FIG. 6 in a sectional view in accordance with the line of intersection VII-VII in FIG. 6;

FIGS. 8 and 9 show two consecutive phases during the production of the valve body that is provided with the valve seal in a two-component injection moulding process.

DETAILED DESCRIPTION OF THE INVENTION

Figure 1:
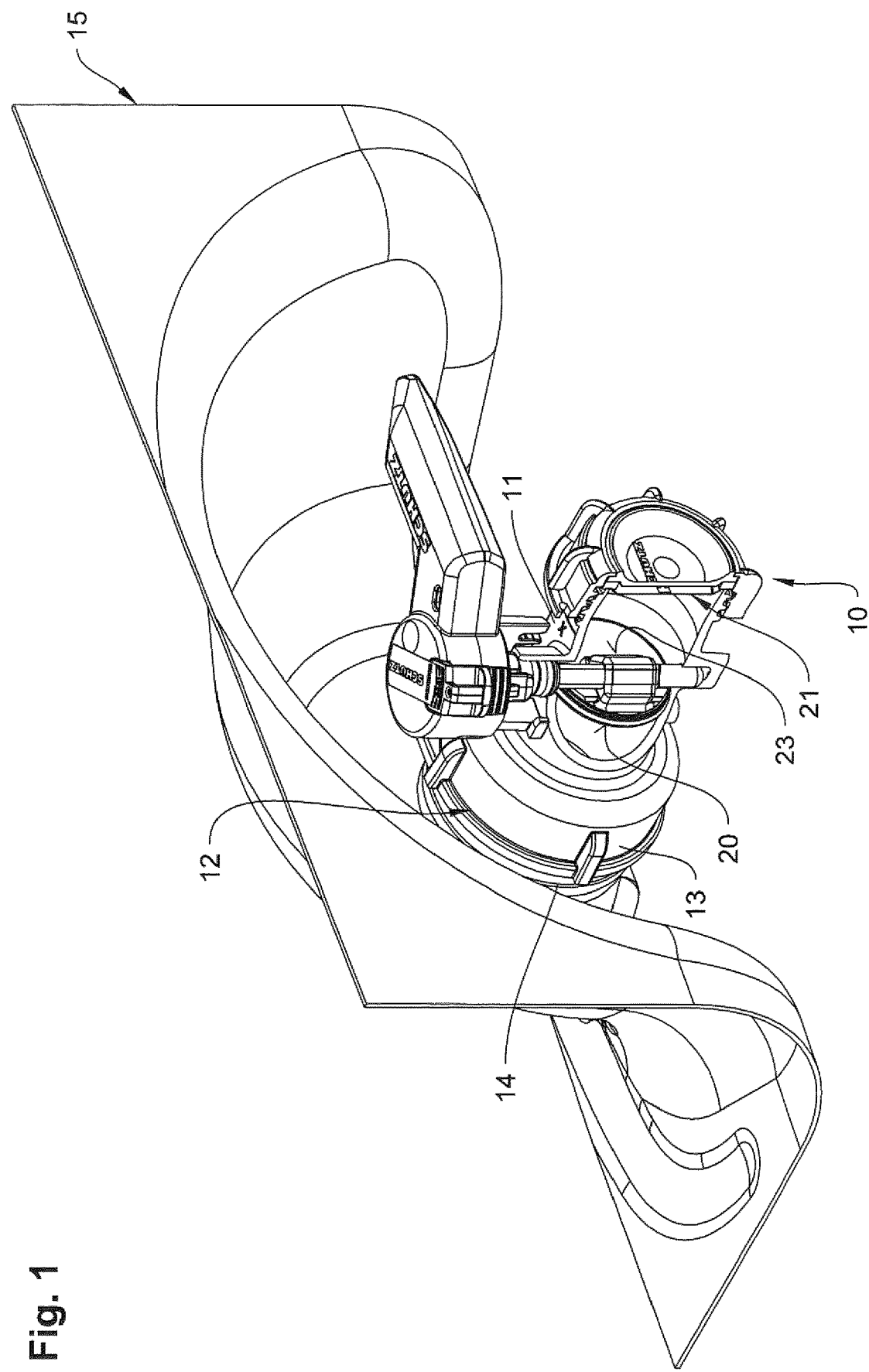
FIG. 1 shows a tapping armature that is arranged at an outlet neck of a transport and storage container for liquids, in the shut-off position.

FIG. 1 shows a tapping armature 10 that includes an armature housing 11 that is coupled to an outlet neck 14 at an inlet end 12 with the aid of a union nut 13, said outlet neck being arranged at a liquid container 15, of which only the armature connecting region is illustrated in FIG. 1. Liquid containers 15 of the type illustrated in FIG. 1 are for example containers that are produced in a blow moulding process, as a component of an Intermediate Bulk Container (IBC) and are arranged, as inner containers, in a grid cage arranged on a pallet.

Figure 2:
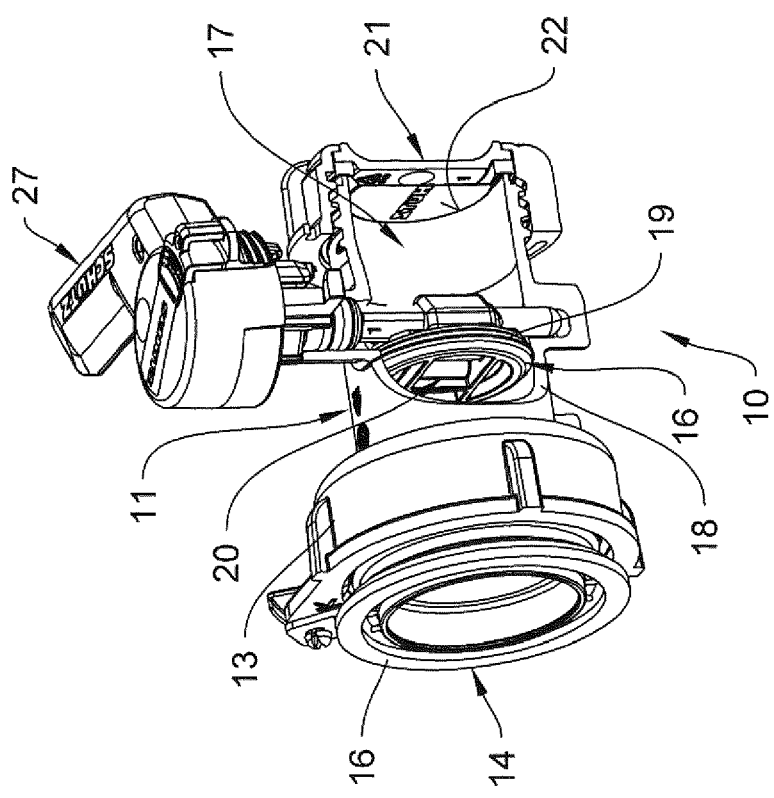
FIG. 2 shows the tapping armature that is illustrated in FIG. 1 in combination with the outlet neck and that is independent from the liquid container that is illustrated in FIG. 1.

As in particular FIG. 2 shows, in the case of the illustrated exemplary embodiment, the tapping armature 10 in combination with the outlet neck 14 that is realised so as to be independent from the liquid container 15 is realised as a mounting unit that can be coupled, for being connected to the liquid container 15, with the aid of a welded connection between a connecting flange 16 of the outlet neck 14, which is realised as a weld neck, and an opening edge of an outlet opening that is realised in the liquid container 15, said opening edge not being illustrated in more detail in FIG. 1, to the liquid container 15.

In FIGS. 1 and 2, the tapping armature 10 is illustrated in its shut-off position, in which a valve body 16 is arranged in a flow cross-section 17 of an outlet tube 18 realised by the armature housing 11 in such a manner that a valve gap that is formed between the valve body 16 and the outlet tube 18 is sealed in a radial sealing plane by means of a valve seal 19 that is realised at the valve body 16.

The valve body 16 includes an inner side 20 that faces a liquid volume received in the liquid container 15 as well as an outer side 23 that is opposite from the inner side 20 of the valve body 16 and that faces an outlet opening 22 that is closed off by means of a screw cap 21.

Figure 3:
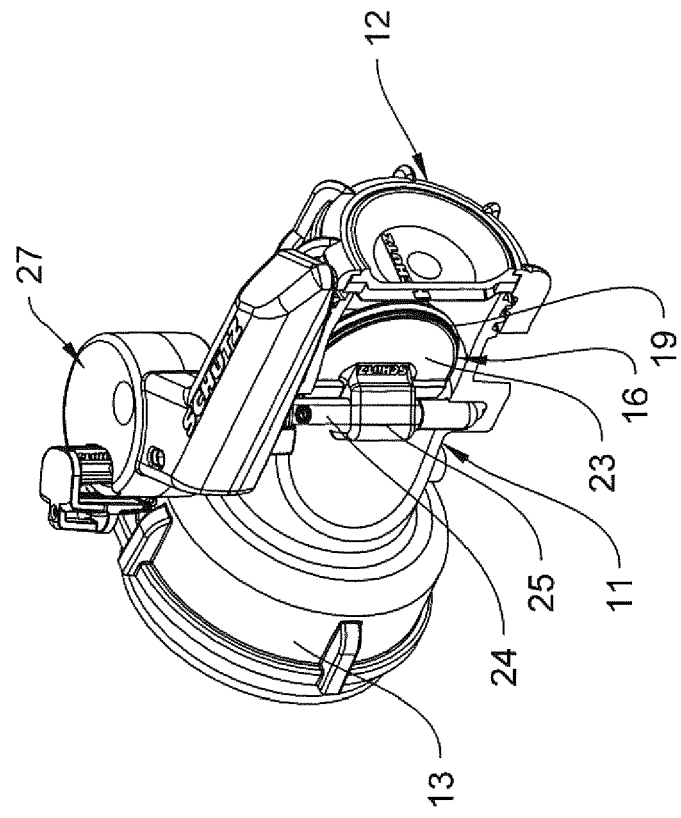
FIG. 3 shows the tapping armature that is illustrated in the shut-off position in FIG. 2 in the open position.

For being actuated, the valve body 16 is, on the outer side 23, coupled to a valve shaft 24 in a rotationally fixed fashion in a shaft reception 25 so that the valve body 16 can be pivoted from the shut-off position that is illustrated in FIGS. 1 and 2 into the open position that is illustrated in FIG. 3 when the valve shaft 24 is being rotated with the aid of a handle 27 that is coupled on a shaft end that is led out of the armature housing 11.

In FIGS. 4 to 7, the valve body 16 that is provided with the valve seal 19 is illustrated as an individual part, in particular FIGS. 5 and 7 revealing that the valve body 16, on the inner side 20, includes an edge elevation 30 that is realised circumferentially at the peripheral edge 29 of the valve body as well as a stiffening land structure 31 and is provided with the shaft reception 25 on the outer side 23. Apart from the fact that the design of the valve body 16 explained above allows for a high degree of stiffness of the valve body, the valve body 16, on grounds of the special valve body geometry, has a valve body cross-section 28 having a substantially uniform wall thickness realisation, which benefits a production of the valve body 16 in an injection moulding process.

As in particular FIG. 7 shows, the valve body 16 is provided with the valve seal 19 in such a manner that the valve seal 19 does not only extend at the peripheral edge 29 of the valve body 16, but that additionally a liquid contact face 32 that is arranged on the inner side 20 is realised by the valve seal 19.

Preferably, the valve body 16 is produced together with the valve seal 19 in a two-component injection moulding process, which allows for producing the valve body 16 that is provided with the valve seal 19 in a two phase injection moulding process that is schematically illustrated in FIGS. 8 and 9.

Initially, for producing the valve body 16, a moulding tool 33 having a lower mould half 34 and an upper mould half 35 is used, the plastic consisting of polypropylene having a glass fibre content that is used in the present case for producing the valve body 16 being injected via the upper mould half 35, which at the same time realises the topography of the inner side of the valve body 16. For carrying out the subsequent production step that is illustrated in FIG. 9, the valve body 16 stays in the lower mould half 34 and the upper mould half 35 is exchanged for a different upper mould half 36 that has a cavity that deviates from the mould half 35 previously used, allowing for realising the valve seal 19 on a sealing contact face 37 of the valve body 16 by injecting a plastic that is made of polypropylene in the present case, in such a manner that a liquid contact face 32 is realised by means of the valve seal 19, said liquid contact face, as it is in particular illustrated in FIG. 1, being exposed to a contact with liquid when the tapping armature 10 is connected to a liquid container 15 that is filled with liquid.

As it can be seen from FIGS. 8 and 9, the sealing contact face 37 does not include any radial offsets so that, after the valve body 16 has been produced in the first injection moulding process phase that is illustrated in FIG. 8, the upper mould half 35 can be taken down from the lower mould half 34 and the valve body 16 stays in its arrangement in the lower mould half 34.

As FIG. 9 shows, the valve seal 19 that is formed in the second process step in the cavity of mould half 36 includes, at a sealing edge 39, an axial end face 38 that is arranged at the peripheral edge 29 of the valve body 16 in such a manner that the axial end face 36 is arranged so as to be substantially flush mounted, in other words without a shoulder being formed, with the outer side 23 of the valve body so that the peripheral edge 29 of the valve body 16 is substantially completely covered by the valve seal 19, without the valve seal 19 axially protruding into the lower mould half 34. Thus, the lower mould half can easily be removed before the valve body 16 that is provided with the valve seal 19 is removed from the upper mould half 36.

The invention claimed is:

1. A tapping armature (10) for liquid containers (15) for being connected to an outlet neck (14) or to an outlet opening of a transport and storage container for liquids, comprising:

an armature housing (11) in which a valve body (16) for opening and closing a flow cross-section (17) of an outlet tube (18) is arranged that is pivotable with the help of a valve shaft (24), said valve body (16) including a valve seal (19) that is arranged, at least partially, at a peripheral edge (29) of the valve body (16), in such a manner that, in a shut-off position of the valve body (16), a valve gap that is formed between the valve body (16) and an internal wall of the outlet tube (18) is sealed in a radial sealing plane by means of the valve seal (19);

wherein besides the peripheral edge (29) only an inner side (20) of the valve body (16) that faces a liquid volume for shut-off is covered by the valve seal (19) in such a manner that a liquid contact face (32) that is arranged on the inner side (20) is realised by the valve seal (19);

wherein the valve seal (19) is materially bonded to the valve body (16) on a sealing contact face (37) of the valve body (16) such that there is no gap between the valve seal (19) and the sealing contact face (37);

wherein the valve seal (19), with an axial end face (38) of a sealing edge (39) that is arranged at the peripheral edge (29) of the valve body is arranged so as to be substantially flush mounted with an outer side (23) of the valve body (16) that is opposite from the inner side (20) of the valve body (16).

2. The tapping armature according to claim 1, wherein the sealing contact face (37) of the valve body (16) does not include any radial offsets.

* * * * *